(12) United States Patent
Herrmann et al.

(10) Patent No.: US 7,324,217 B2
(45) Date of Patent: Jan. 29, 2008

(54) DEVICE AND METHOD FOR MEASURING COMPONENTS

(75) Inventors: Guenter Herrmann, Guetersloh (DE); Frank Hilbk-Kortenbruck, Warendorf (DE)

(73) Assignee: Claas Fertigungstechnik GmbH, Beelen (DE)

( * ) Notice: Subject to any disclaimer, the term of this patent is extended or adjusted under 35 U.S.C. 154(b) by 0 days.

(21) Appl. No.: 11/120,398

(22) Filed: May 3, 2005

(65) Prior Publication Data

US 2005/0248774 A1    Nov. 10, 2005

(30) Foreign Application Priority Data

May 6, 2004   (DE) ...................... 10 2004 023 033

(51) Int. Cl.
*G01B 11/24* (2006.01)
(52) U.S. Cl. .................. 356/606; 356/601; 356/607
(58) Field of Classification Search ................ 356/601, 356/606, 607, 608; 700/245, 259
See application file for complete search history.

(56) References Cited

U.S. PATENT DOCUMENTS

| | | | | |
|---|---|---|---|---|
| 4,498,778 A | * | 2/1985 | White | ........................ 356/606 |
| 4,967,370 A | * | 10/1990 | Stern et al. | ................. 700/254 |
| 6,615,112 B1 | * | 9/2003 | Roos | .......................... 700/254 |

FOREIGN PATENT DOCUMENTS

| | | |
|---|---|---|
| DE | 299 11 187 U1 | 9/1999 |
| DE | 199 31 676 | 1/2001 |
| DE | 200 03 381 U1 | 8/2001 |
| DE | 100 48 096 | 4/2002 |
| EP | 0 312 119 | 4/1989 |
| EP | 1 302 285 | 4/2003 |

* cited by examiner

*Primary Examiner*—Roy M. Punnoose
(74) *Attorney, Agent, or Firm*—Michael J. Striker (57) ABSTRACT

A method is disclosed for measuring components (1) using a measurement system (20) guided by a manipulator (10). In this process, reference features (9, 9a, . . . , 9i) are decentrally located at various positions near a component (1) to be measured, the reference features each being assigned to at least one measuring object (6) located at a close distance to the particular reference feature (9, 9a, . . . , 9i) on the component (1) to be measured. Before a test object (6) is measured, the measuring system (20) is first brought into a calibration position using the manipulator (10), and the reference feature (9, 9a, . . . , 9i) assigned to the particular test object (6) is measured using the measuring system (20) to calibrate a coordinate system of the manipulator (10). Using the manipulator (10), the measuring system (20) is then moved into a measurement position, where the relevant test object (6) is measured. A corresponding device for measuring components and a component carrier (7) are also disclosed.

18 Claims, 4 Drawing Sheets

DEVICE AND METHOD FOR MEASURING COMPONENTS

CROSS-REFERENCE TO RELATED APPLICATIONS

This application contains some subject matter which has similarities with the subject matter of earlier patent application Ser. Nos. 11/385,116 and 10/931,598.

BACKGROUND OF THE INVENTION

The present invention relates to a method for measuring components using a measurement system guided by a manipulator, preferably by a multi-axis working robot, and a corresponding device for measuring components, with a manipulator and a measurement system located on the manipulator such that the measurement system is movable in space using the manipulator. The present invention also relates to a component carrier for use in a method of this type.

Modern assembly and production processes are based increasingly on the use of assembly and production robots, the position of the actuators of which is changeable with a rotational motion around a large number of swivelling axes to achieve high spacial flexibility of motion of the robot. The production processes, which are becoming increasingly complex, also place high requirements on the precision of motion of the robot actuators. As the number of swivelling axes increases, the precision of motion drops off considerably in some cases. This behavior is due substantially to the large number of robot components and their component tolerances, and the increasing number of swivel axis bearings and their bearing play. To enable robotic systems of this type to perform highly precise motions nonetheless, they must be readjusted in some cases at defined time intervals using very complex calibration procedures.

Extensive effort was made in the past to simplify these calibration procedures. A calibration procedure of this type was made known in EP 1 302 285, for example, which discloses an effective yet simply designed calibration procedure for readjusting robot movements based on complex mathematical relationships. Due to the complex mathematical relationships and the high technical complexity required in some cases to implement the procedure, calibration procedures of this type are unsuitable for improving the precision of movement of assembly and production robots to such an extent such that actuators can be assigned to them that enable highly precise measurements of components, however, particularly in light of the constantly changing environmental conditions in the working environment of the robots. To perform highly precise measurements of components, measurement methods have therefore become established that are carried out in "measurement rooms" under laboratory conditions. In addition to the large amount of time required to carry out measurement methods of this type, they have the primary disadvantage of being limited in terms of their ability to be integrated in assembly or production lines. In contrast, robot systems with sensors that can carry out highly precise measurements would be well suited for integration in assembly and production lines, but the fact that the precision of the movement of the robot segments is inadequate prevents integration of this type.

A task of the present invention, therefore, is to provide a method and a device for measuring components with a manipulator-driven, in particular robot-driven, measurement system, the method and device preventing the described disadvantages of the related art and combining the great flexibility of movement of manipulators, in particular robot systems, with the measurement accuracy of highly precise measurement procedures.

SUMMARY OF THE INVENTION

According to the present invention, with the proposed method, reference features are decentrally located at various positions close to a component to be measured. Each of these reference features is assigned to at least one test object that is located at a short distance from the relevant reference feature on the component to be measured or alternatively to at least one geometrical feature to be measured. The test object can be a simple measurement point on the component, or, e.g., a defined geometry of a contour of a component, a bore hole, etc., in the component, or the like. In other words, points as well as lines extending into space and entire surfaces of the component can be measured.

With the method according to the present invention, the measurement system is first brought into a calibration position using the manipulator before a test object is measured. In the calibration position, the reference feature assigned to the relevant test object to be measured is measured using the measurement system, and the coordinate system of the manipulator is calibrated. This calibration method is based on a full 3-dimensional measurement of the reference feature. The measurement system is then moved by the manipulator along the shortest possible path into a measurement position, where the test object is measured. In principle, any calibration position and measurement position can be selected, provided the relevant reference feature and/or the particular test object can be measured by the measurement system used based on these positions.

It is ensured via the decentral arrangement, according to the present invention, of the reference features and the measurement procedure that the absolute distance between the calibration position at which the last calibration of the coordinate system was carried out before a test object was measured, and the measurement position where the test object is actually measured is small. Since the positioning errors of the manipulator are largely relative errors, however, the absolute magnitude of which depends on the length of path covered, this necessarily also results in a very low absolute deviation in the positioning of the measurement system carried out with the manipulator. The present invention therefore enables measurements that are considerably more accurate, thereby also enabling highly precise measurements of large components, with which only minimal tolerances of deviation are permitted.

A corresponding device for measuring components according to this method must first include a manipulator and a measurement system located on the manipulator such that the measurement system is movable in space using the manipulator. A particularly high flexibility of measurement of components with complex designs is achieved when the manipulator is configured as a multi-axis working robot that can move to the most diverse component positions with great flexibility.

Furthermore, the device must include a number of reference features located decentrally at various positions close to a component to be measured, the reference features being assigned to at least one test object that is located at a short distance from the relevant reference feature on the component to be measured.

Moreover, the device requires a suitable control device that is designed such that, before a measurement is performed on a test object, the measurement system is first brought into a calibration position using the manipulator, in which said calibration position the corresponding reference feature is measured with the aid of the measurement system to calibrate the coordinate systems of the manipulator. It is essential that the measurement system is able to make full 3-dimensional measurement of the reference features as well as of the test object. Only then is the measurement system moved via the manipulator into a measurement position, where the relevant test object is measured.

The dependent claims and the description contain particularly advantageous configurations and further developments of the invention. In particular, the device according to the present invention can also be designed analogous to the dependent method claims and vice versa.

With a very particularly preferred exemplary embodiment, a group of test objects on the component to be measured is assigned to at least one of the reference features. Depending on the precision required, before the entire group of test objects is measured, for example, the coordinate system of the manipulator can be calibrated once based on the reference feature assigned to this group of test objects, the reference feature being located in the region of the group of test objects. The test objects in this group are then measured. As soon as the measurements have been carried out on all test objects in the particular group, a further group of test objects can be moved to, where the manipulator coordinate system is first recalibrated based on the reference feature located there. In the case of measurements that must be carried out with particularly high precision, the assigned reference feature can be moved to anew before every measurement of a test object in a group of test objects to also calibrate the coordinate system between the measurements of the individual test objects. In general, a plurality of reference features can also be assigned to a test object or a group of test objects, and the measurement accuracy can be improved even further, e.g., via interpolation.

The device for measuring components preferably includes a component carrier that includes suitable means, e.g., clamping claws or the like, for retaining the component in a defined position on the component carrier. The retaining means can depend on the type of component carrier and the component to be retained, as well as its position in space, e.g., depending on whether the component rests on the component carrier or hangs on it. It suffices, in principle, to ensure that a defined position on the component carrier is reliably maintained. For example, the component could be placed on a component carrier that includes special recesses or projections as the retaining means, via which the component that has been placed on the component carrier is centered in the defined position.

Furthermore, this component carrier must include a number of reference features located in various defined positions close to the component that has been positioned on the component carrier. This design has the advantage that the reference features need not be repositioned to measure every single component, but rather can remain on the component carrier, and the component, to be measured, is simply positioned in the component carrier accordingly. It is also possible, in principle, to use a plurality of component carriers in a process chain, the component carriers having an identical design and identical reference features in the same positions.

To enable universal use of a component carrier of this type, it preferably includes—in addition to the retaining means for positioning a component on the component carrier in a defined manner—a number of reference feature fixing elements at various defined positions on the component carrier, where corresponding reference features can be positioned. In this manner, the most diverse types of components can be measured on the same component carrier, for example, by adding reference features depending on the type and shape of the component, i.e., by positioning them on the component carrier in addition or removing reference features if they are not required for the particular component or if they would pose an interference when the component is placed on the component carrier. Basically, this component carrier can also include reference features that are permanently fixed in position and cannot be changed. The reference feature fixing elements can be defined screw holes or clamping holes or the like, for example. It is essential that the reference features have an accurately defined, exact position relative to the coordinate system of the component carrier and, therefore, relative to each other. Depending on the type of reference feature used, it must also be ensured that it is oriented correctly in space.

Basically, any type of measurement system capable of carrying out highly precise measurements can be used as the measurement system. A measurement system that operates in a contactless manner is particularly preferred, however.

A 3D-image acquisition system such as a camera system or the like can be used as the contactless measurement system, for example. By evaluating the images, the position of the measurement system in space relative to the reference feature and/or test object or, vice versa, the position of the test object and/or the reference feature relative to the coordinate system of the measurement system and/or the manipulator can be determined. With regard for this publication, the term "position" shall be understood to mean not only the location, but also the orientation of the measurement system and/or a component, test object, reference feature or any other object in the space, unless explicitly mentioned otherwise.

A highly precise measurement system with a simple design is a contour measurement device, for example, That includes a signal source for generating an optical sensing area and a unit that depicts a section region of the sensing area with a measurement range. A laser can be used preferably as the signal source. With a measurement system of this type, the reference feature and the test objects of the component can be measured with the aid of a laser light section pattern. Laser light section patterns of this type are already used in many different types of measurement applications.

With an exemplary embodiment having a particularly simple design, when the manipulator is fixed in place, the measurement system for measuring the reference feature and the test objects of the component is positioned on the manipulator such that it is linearly movable along a measurement system axis and/or pivotable around a measurement system axis. By way of the linearly movable or pivotable coupling of the measurement system via an additional measurement system axis, preferably on the outer end of the manipulator, it can be ensured in a very simple manner that a measuring range is scanned by the sensing area of the contour measuring device, to thereby carry out an exact measurement of the entire region and the objects located therein without the manipulator itself having to be moved. In this case, when a calibration is carried out, the exact position (i.e., the spacial coordinates and the orientation) of the measurement system axis is determined, particularly preferably, in a coordinate system that is fixed relative to the reference feature and, therefore, the component and/or the component carrier.

With regard for the component carrier and/or the component, the reference features represent geometric reference points that are fixed in position, the positions in space of which are preferably stored in a corresponding calculating unit in the measurement system. Since the distances of the measured test objects relative to the assigned reference feature can be determined exactly by data processing systems of simple design, and the distances of the individual reference features on the component carrier are also known exactly, the distances between different test objects on the component can also be determined over larger distances with relatively small error. The error that must be accepted is then essentially only in the magnitude of the relative error of the manipulator position based on the short distances between the test objects and the associated reference features and/or between the particular calibration and measurement positions. The absolute error generated in this manner is extremely small relative to the total distance between the test objects. As a result, the geometry of larger components can also be depicted by measuring the positions of individual test objects located far apart from each other on the component, provided they are in a spacial coordinate system, such that this measurement data can also be used to qualitatively determine the geometry not only of the individual test objects, but also of the entire component. As a result, It is possible to determine deviations of form and position of the individual measured objects on the component and deviations of form of the overall component. To easily perform a complete calibration of the manipulator coordinate system and, in particular, to determine the exact position of the measurement system axis in all of its degrees of freedom in a measurement, it is possible to use geometric bodies, preferably pyramid-shaped geometric bodies, as the reference features. When the reference features are scanned using the optical sensing area of a contour measurement device, the exact position of the measurement system radiating the sensing area can be determined very easily based on the position of the edges and surfaces of a geometric body of this type.

DETAILED DESCRIPTION OF THE PREFERRED EMBODIMENTS

Figure 1:
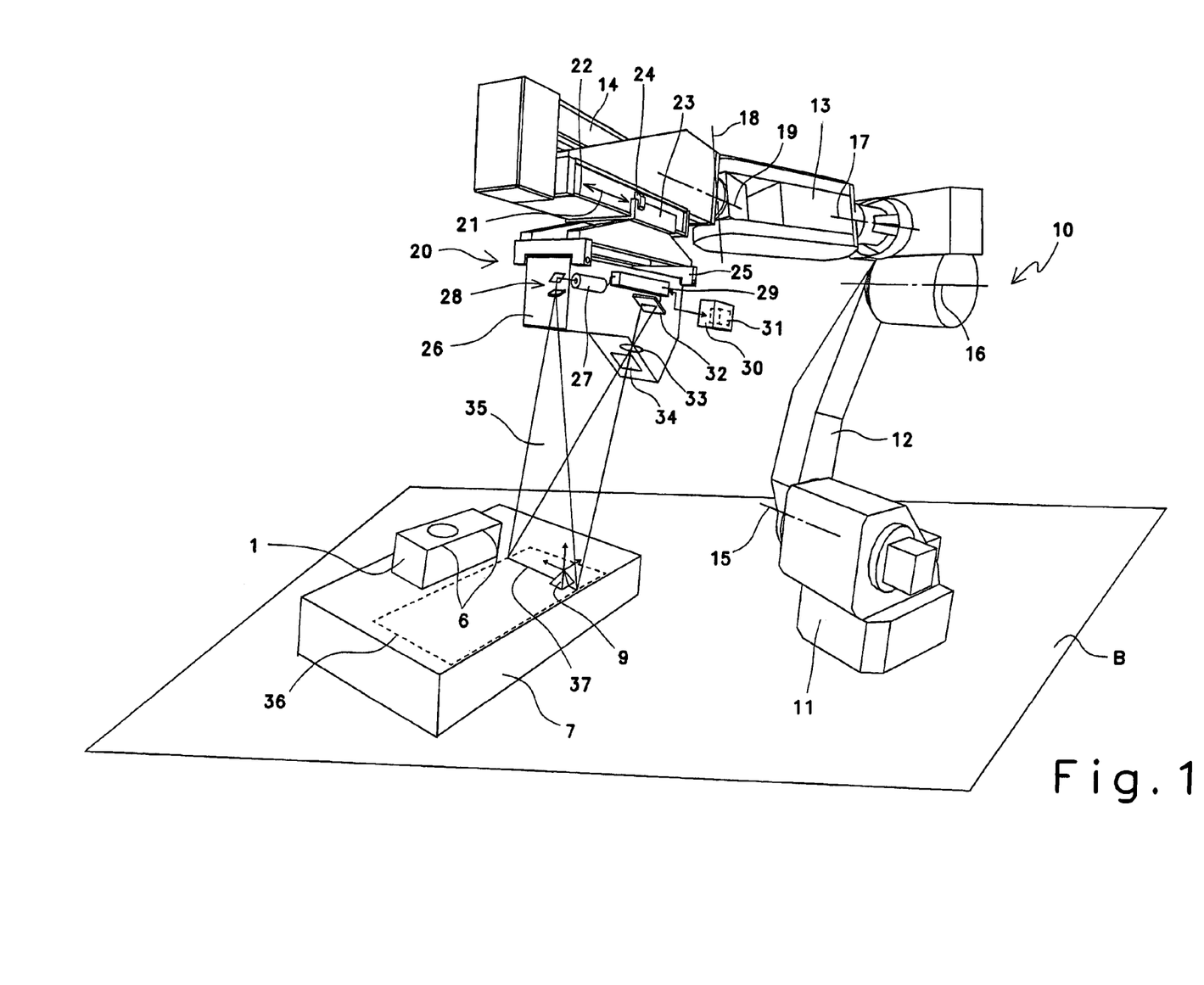
FIG. 1 shows a perspective view of a manipulator with a measurement system performing a measurement of a reference feature.

A manipulator 10 designed as an assembly and production robot 10, referred to below as a working robot 10, is shown in FIG. 1. Working robot 10 is anchored on the bottom side in base B via a pedestal 11 such that it is fixed in position. Working robot 10 includes a plurality of segments 12 through 14 in a manner known per se, which, in totality, form the tool carrier. Individual segments 12 through 14 are movable around a large number of horizontal and vertical swivel axes 15 through 19.

In the exemplary embodiment shown, outer segment 14 of working robot 10 accommodates a retaining device configured in the manner of a linear guide system with a guide rail 22 and a guide carriage 23. Guide rail 22 is secured to outer segment 14 of working robot 10. An adapter piece 25 that holds measurement system 20 is secured to guide carriage 23. When working robot 10 is fixed in place, measurement system 20 is therefore capable of being moved along a linear measurement system axis 21.

Measurement system 20 includes a contour measurement device 26—a laser light section sensor in this case—that is secured to adapter piece 25 in a torsion-proof manner. Contour measurement device 26 includes, in a manner known per se, a laser light source 27, the laser beam of which is deflected and split by a mirror-lens system 28, so that it covers a sensing area 35. A measurement method with a sensing area 35 of this type formed out of a laser beam is also referred to as a laser light section pattern, and the measurement device that generates sensing area 35 is therefore also referred to as a laser light section sensor. In principle, other optical methods can also be used to design a sensor of this type, the optical methods generating either a flat or punctiform sensing area.

In its region facing away from mirror-lens system 28, contour measuring device 26 includes an objective lens 33 protected by a viewing window 34. Objective lens detects section region 37 between sensing area 35 and a measuring range 36 and forwards it to a detector 32, which is also referred to as a graphic display unit 32. Detector 32 reproduces section region 37. Via electronic signal unit 29, the detector signals can then be made available for further processing as output signals. In this case, signal unit 29 also controls laser 27 and mirror-lens system 28.

The output signals are forwarded to control device 30, in which a calculating unit 31 is also located, in which various coordinate systems and the positions of individual objects within these coordinate systems are stored and/or are capable of being calculated.

To carry out a measurement, measurement system 20 is moved—with working robot 20 fixed in place—along measurement system axis 21 in a linear manner, and sensing area 35 and/or section region 37 scans a measurement region 36 on a component carrier 7 and/or a component 1. The size of measurement region 36 depends on the extent of fanning of the laser beam in mirror-lens system 28 and the path traveled by guide carriage 23 on guide rail 22.

FIG. 1 shows schematically how a component 1 is positioned on component carrier 7. Component carrier 7 and component 1 are shown very small in size in FIG. 1. In reality, the components are usually considerably larger, even though the present invention can also be used with smaller components. In the simplest case, the component can be screwed onto component carrier 7 and/or retained via clamping or the like. It can also be simply placed in a recess or the like that ensures exact positioning of component 1 in component carrier 7. Depending on the mounting, component carrier 7 can also be guided past working robot 10 with measurement system 20, e.g., hanging laterally or even overhead.

Highly diverse test objects 6 on component 1, e.g., edges of the component or bore holes, will be measured. A reference feature 9 is located close to component 1 on component carrier 7. Said reference feature is a pyramid-shaped body, the position of which (including the orientation of the pyramid axes) on component carrier 7 is exactly known. The corresponding coordinates are stored in calculating unit 31. Reference feature 9 is assigned to nearby test objects 6 on component 1; it serves to calibrate the coordinate system of working robot 10 before it moves to associated test objects 6 to perform the measurement.

Figure 4:
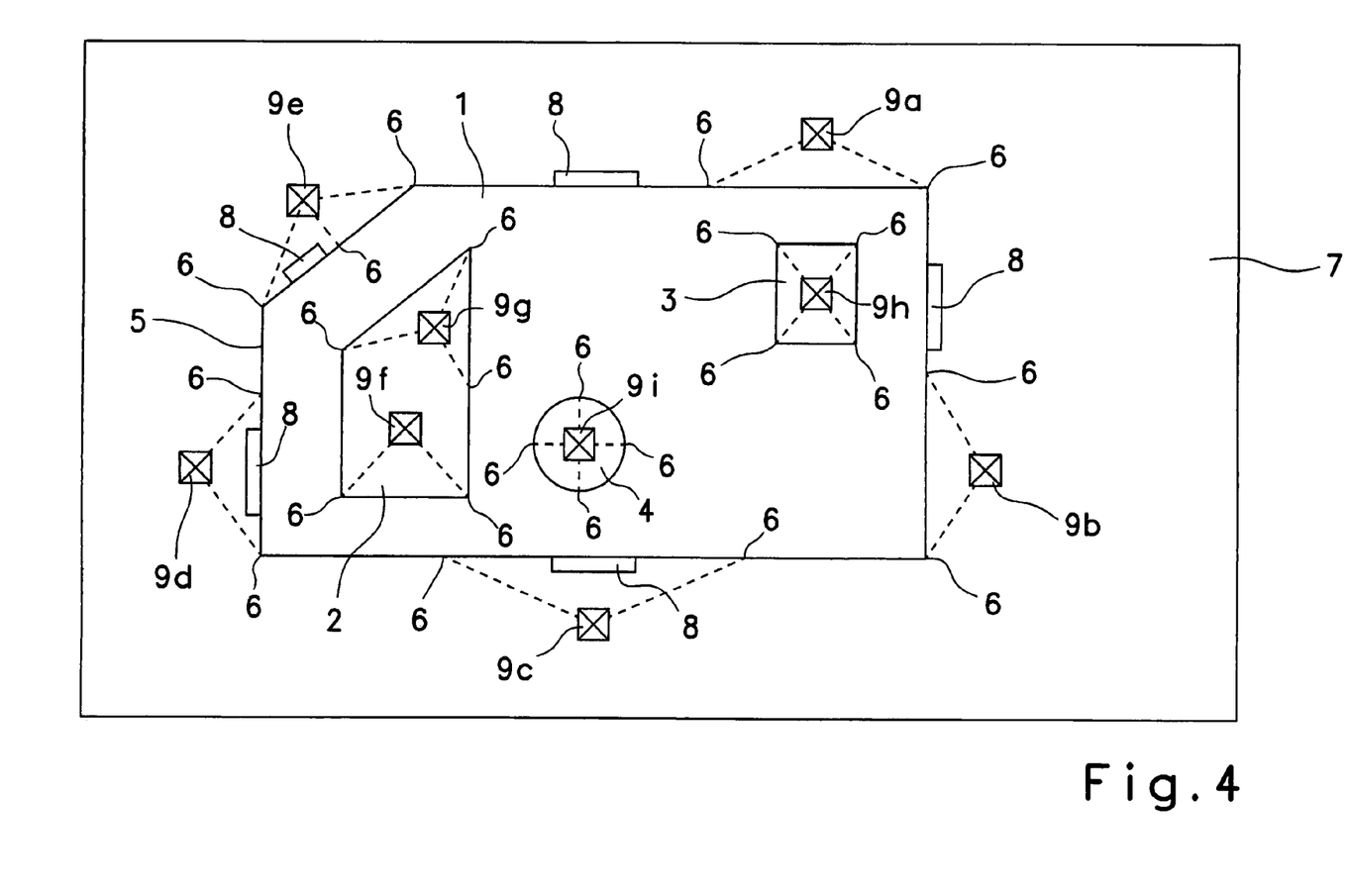
FIG. 4 shows a top view of a component carrier with a plurality of reference features and a component having a plurality of sections.

FIG. 4 shows a top view of a component 1 having a larger surface area, e.g., a chassis part, located on a correspondingly large component carrier 7. The dimensions of component 1 must be measured with very low tolerances. To measure component 1 exactly, measurement system 20 must be moved with the aid of working robot 10 to a large number of test objects 6, to measure them. Test objects 6 shown in FIG. 4 are individual measurement points on geometric structures, e.g., edges or corners of outer contour 5 of component 1 and the contours of sections 2, 3, holes 4 or bore holes of component 1, the positions of which must be determined as exactly as possible.

In this case, component 1 is fixed with the aid of mounts 8 in an exactly defined position on component carrier 7. In addition, according to the present invention, reference features 9a, . . . , 9i are located in a large number of positions on component carrier 7. A group of test objects 6 is assigned to each of these reference features 9a, . . . , 9i, which are located as close as possible to the particular reference feature, which is a pyramid body in this case. The individual test objects 6 and the particular reference features 9a, . . . , 9i to which they are assigned are indicated in FIG. 4 by dashed lines.

According to the present invention, a group of test objects 6 on component 1 is measured by first moving to associated reference feature 9a, . . . , 9i and measuring it. This means the measurement system 20 is first moved into a calibration position with the aid of working robot 10, as indicated schematically in FIG. 1. Measurement system 20 is then moved—with working robot 10 fixed in position—along measurement system axis 21 such that sensing area 35 scans a measurement region 36 in which reference feature 9, 9a, . . . , 9i is located. With the aid of the exact coordinates of particular reference feature 9, 9a, . . . , 9i stored in calculation unit 31, the internal coordinate system of working robot 10 can then be calibrated. In particular, the position of measurement system axis 21 in space can then also be determined exactly. For example, the coordinate system of working robot 10 in the calibration position can be set to zero, whereby measurement system axis 21 moves along a certain coordinate system axis.

After the exact coordinates of working robot 10 have been determined in this manner, a measurement position can be moved into in the direction of component 1, e.g., directly above test object 6. In this position, measurement system 20 again moves along measurement system axis 21, so that test object 6, e.g., a certain point on the contour of component 1, is scanned. This is shown in FIG. 2.

Figure 2:
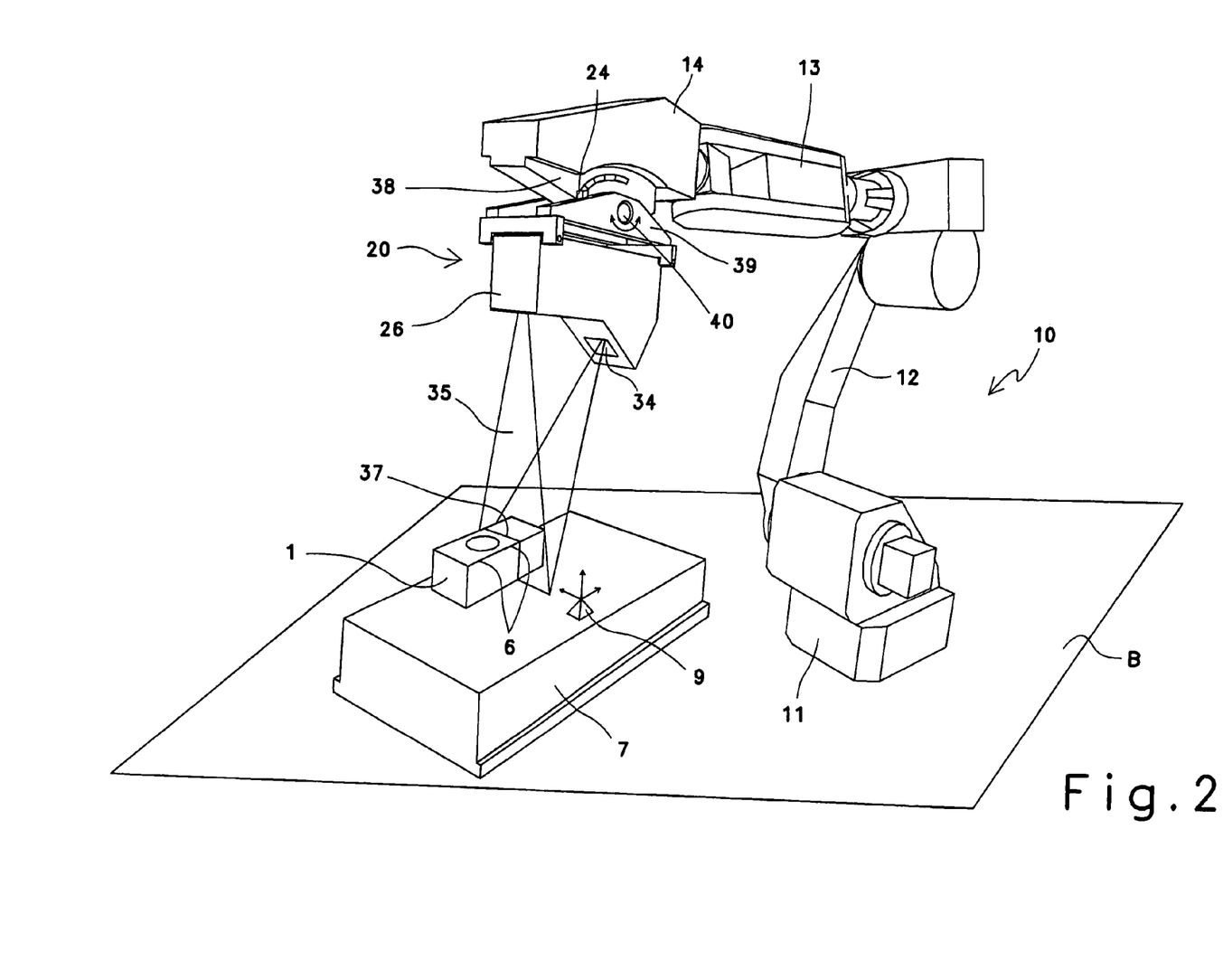
FIG. 2 shows a perspective illustration of a further embodiment of a manipulator with a measurement system performing a measurement of a test object.

FIG. 2 also shows a second variant of the coupling of measurement system 20 to outer segment 14 of working robot 10. Contour measurement device 26 is secured to an adapter piece 39 that is hingedly mounted on a swivel mount 38 such that it can pivot around a measurement system axis 40, the swivel mount being rigidly secured to outer segment 14 of working robot 10. In this case as well, appropriate measurement devices determine the angular position of measurement system 20 relative to outer segment 14 of working robot 10, whereby a device for detecting angle of rotation is used that is suitable for highly exact measurements.

To ensure that highly precise position coordinates of test objects 6 and reference features 9, 9a, . . . , 9i can be generated, it is necessary to detect, using sensors, the change in position of sensing area 35, and to transmit it to control device 30 and/or calculating unit 31. This change in position can be determined using a travel measurement system 24 in a manner that is known per se and is therefore not described in greater detail. Depending on whether the positioning of the contour measurement device is carried out using a linear guide system or with the aid of a swivel axis, scales having a linear or circular configuration are located, e.g., on guide rail 22 and/or guide carriage 23, and/or on at least one of the parts 38, 39 joined with each other in a pivotable manner, the markings on the scales being detected by position sensors located on each of the associated counterparts. The scales are typically made of glass, whereby the markings are usually engraved or milled in the glass. Using a travel measurement system 24 of this type, the exact position of guide carriage 23 relative to guide rail 22, or the exact angular position of measurement system 20 relative to outer segment 14 of working robot 10 is determined, for example, and this value is transmitted to control device 30. A travel measurement system 24 of this type shown as a rough schematic illustration in FIGS. 1 and 2.

Figure 3:
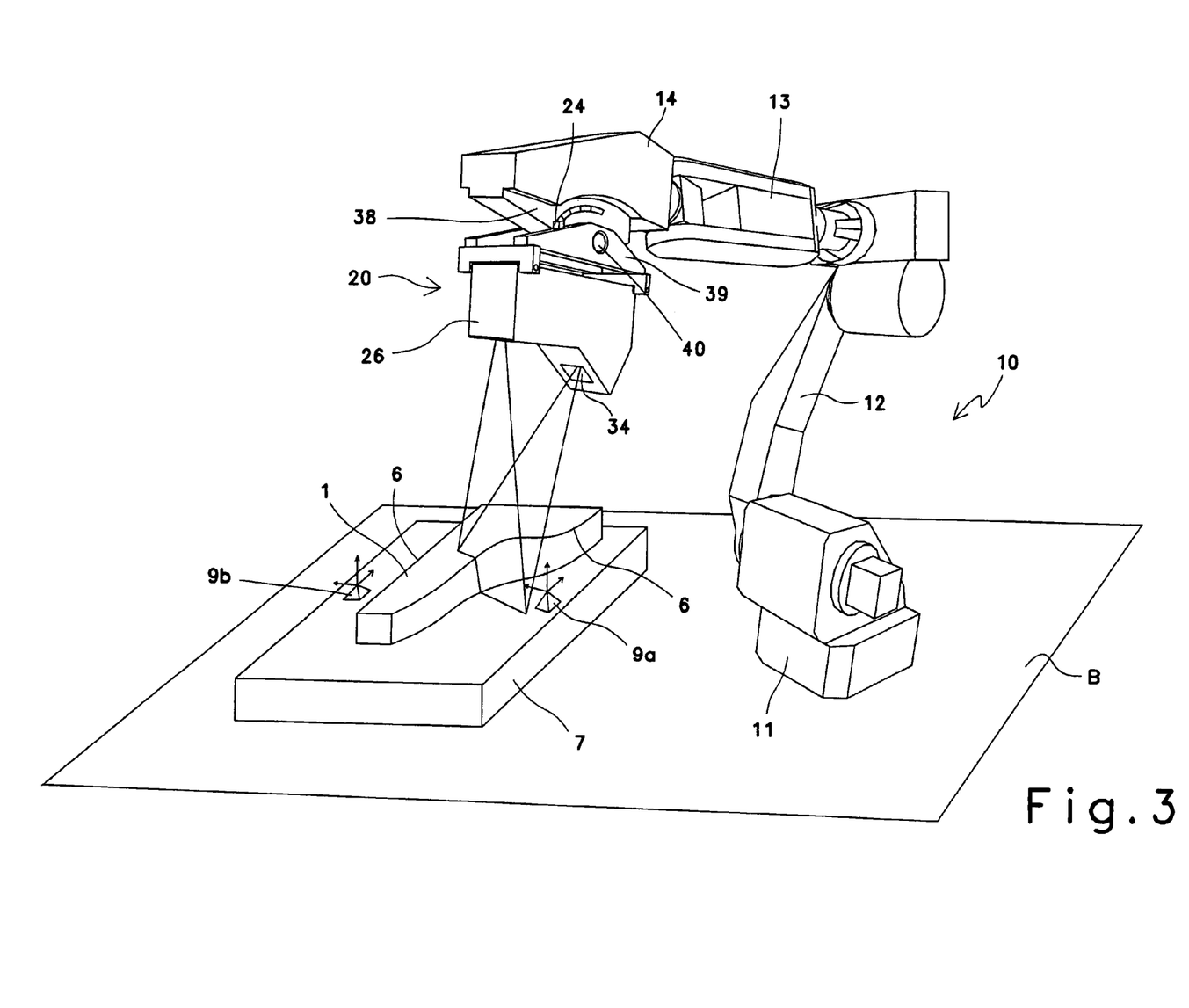
FIG. 3 shows a depiction of the measurement of a component having a complex geometric structure.

FIG. 3 shows the working robot with measurement system 20 according to FIG. 2 during measurement of a complex contour of a component 1 on component carrier 7. With this exemplary embodiment, a first test object 6 is the curved contour of front side (as shown in the figure) of component 1. To measure this contour, calibration is first carried out on reference feature 9a, which is located directly in front of the contour. The rear, straight edge of component 1 will be measured next. To do this, working robot 10 first moves over reference feature 9b located behind the rear edge. By measuring reference feature 9b with measurement system 20, the robot coordinate system is recalibrated in the new position. Only then is the rear edge of component 1 moved to and measured.

Highly precise measurements of larger components can also be carried out easily with the method according to the present invention and/or the device according to the present invention. This is illustrated clearly with the top view of component 1 in FIG. 4 in particular. When measuring a larger component 1, the outer dimensions are usually determined, among others. This means that the distance between the upper right corner and the lower left corner must be determined as exactly as possible, for example. This is possible only if working robot 10 is first moved into the upper right corner and measures its position, then moves to the lower left corner and performs a position measurement there. Since the magnitude of the error in the position determination is relative to the path covered by working robot 10, however, a very large error would occur in the determination of these diagonal segments of the component. This error is reduced considerably with the method according to the present invention, since the coordinate system of working robot 10 is calibrated before each of the individual measurements by measuring reference features 9a, 9d assigned to the respective corner points. The absolute error that occurs when working robot 10 positions measurement system 20 during measurement of the two corner points then substantially corresponds only to the relative error based on the distances of the two corner points to be measured to the particular associated reference features 9a, 9d. The absolute error is therefore reduced considerably by this method, so that very large components can also be measured with sufficiently high precision using robot-guided measurement systems. In particular, the method according to the present invention allows tolerances of form and position of various test objects to be checked relative to each other, such as the alignment of bore holes over large distances.

Mention is made once more that the devices and components shown in the figures are only exemplary embodiments that can be changed in various manners without leaving the scope of the present invention. For example, instead of moving or swiveling measurement system 20 on outer segment 14 to perform a measurement, it is also possible to move pedestal 11 of entire working robot 10 within a linear guide designed with adequate precision. Likewise, provided that measuring region 36 reachable by sensing area 35 is large enough, a plurality of test objects on the component can also be measured in a single measurement run during displacement or swivelling of the measurement system along the measurement system axis. Likewise, provided that a certain test object 6 is actually located very close to associated reference feature 9, 9a, . . . , 9i, this reference feature 9, 9a, . . . , 9i could also be measured together with test object 6 in a single measurement run.

The invention claimed is:

1. A method for measuring components using a measurement system guided by a manipulator,
   whereby reference features are decentrally located at various positions close to a component to be measured, the reference features each being assigned to at least one test object located at a close distance to the relevant reference feature to be measured,
   and, whereby, before a test object is measured, the measurement system is first brought into a calibration position using the manipulator, and the reference feature assigned to the particular test object is measured using the measuring system to calibrate a coordinate system of the manipulator,
   the measurement system is then moved via the manipulator into a measurement position which is located next to the calibration position, and the particular test object is measured in the calibration position, to measure point and lines extending into space and entire surfaces of the component.

2. The method as recited in claim 1, wherein a group of test objects on the component to be measured is assigned to at least one of the reference features.

3. The method as recited in claim 1, wherein the measurement of the reference feature and the measurement of the test objects of the component are carried out in a contactless manner using the measurement system.

4. The method as recited in claim 3, wherein a laser light section pattern is provided to measure the reference feature the test objects of the component.

5. The method as recited in claim 1, wherein the calibration position is assigned near to the at least one test object to be measured.

6. The method as recited in claim 1, wherein the component contains a plurality of such test objects, and each of the test objects comprises at least one reference feature to calibrate the measurement system before measuring the respective test object.

7. A method for measuring components using a measurement system guided by a manipulator,
   whereby reference features are decentrally located at various positions close to a component to be measured, the reference features each being assigned to at least one test object located at a close distance to the relevant reference feature to be measured,
   whereby, before a test object is measured, the measurement system is first brought into a calibration position using the manipulator,
   whereby the reference feature assigned to the particular test object is measured using the measuring system to calibrate a coordinate system of the manipulator,
   whereby the measurement system is then moved via the manipulator into a measurement position which is located next to the calibration position, whereby the particular test object is measured in the calibration position, to measure point and lines extending into space and entire surfaces of the component,
   wherein, to measure the test objects of the component with the manipulator fixed in place, the measurement system is located on the manipulator such that it is linearly movable along a measurement system axis and/or pivotable around a measurement system axis and, during calibration, the position of the measurement system axis is determined in a coordinate system that is fixed relative to the reference feature.

8. The device for measuring components, with
   a manipulator,
   a measurement system located on the manipulator such that the measurement system is movable in space via the manipulator,
   a number of reference features decentrally located at various positions close to a component to be measured, the reference features each being assigned to at least one test object that is located at a close distance to the particular reference feature to be measured,
   and a control device designed such that the measurement system is first brought into a calibration position using the manipulator before a test object is measured, and the reference feature assigned to the particular test object is measured using the measurement system to calibrate a coordinate system of the manipulator,
   and the measurement system is then moved into a measurement position using the manipulator, which is located next to the calibration position and in which the particular test object is measured.

9. The device as recited in claim 8, characterized by a component carrier with means for retaining the component in a defined position on the component carrier and with a number of reference features located on the component carrier at defined various positions close to a positioned component.

10. The device as recited in claim 8, wherein the measurement system includes a measurement system that operates in a contactless manner.

11. The device as recited in claim 8, wherein the reference features represent stationary geometric reference points stored in a calculating unit in terms of their position in space.

12. The device as recited in claim 8, wherein each of the reference features includes a geometric body.

13. The device as recited in claim 8, wherein the measurement system includes a contour measuring device with a signal source for generating an optical sensing area and a graphic display unit that reproduces a section region of the sensing area with a measurement range.

14. The device as recited in claim 13, wherein the signal source includes a laser beam source.

15. The device as recited in claim 8, wherein the calibration position is assigned near to the at least one test object to be measured.

16. The device as recited in claim 8, wherein the component contains a plurality of such test objects, and each of the test objects comprises at least one reference feature to calibrate the measurement system before measuring the respective test object.

17. Component carrier for use in a method for measuring components using a measurement system guided by a manipulator, whereby reference features are decentrally located at various positions close to a component to be measured, the reference features each being assigned to at least one test object located at a close distance to the relevant reference feature to be measured, and, whereby, before a test object is measured, the measurement system is first brought into a calibration position using the manipulator, and the reference feature assigned to the particular test object is measured using the measuring system to calibrate a coordinate system of the manipulator, the measurement system is then moved via the manipulator into a measurement position which is located next to the calibration position, and the particular test object is measured in the calibration position, to measure point and lines extending into space and entire surfaces of the component, the component carrier comprising means for holding a component in a defined position on the component carrier, and a number of reference features and/or reference feature fixing elements for securing corresponding reference features to the component carrier located in defined various positions on the component carrier close to a positioned component.

18. The device for measuring components, with a manipulator, a measurement system located on the manipulator such that the measurement system is movable in space via the manipulator, a number of reference features decentrally located at various positions close to a component to be measured, the reference features each being assigned to at least one test object that is located at a close distance to the particular reference feature to be measured, and a control device designed such that the measurement system is first brought into a calibration position using the manipulator before a test object is measured, and the reference feature assigned to the particular test object is measured using the measurement system to calibrate a coordinate system of the manipulator, and the measurement system is then moved into a measurement position using the manipulator, which is located next to the calibration position and in which the particular test object is measured wherein, to measure the test objects of the component with the manipulator fixed in place, the measurement system is located on the manipulator such that it is linearly movable along a measurement system axis and/or pivotable around a measurement system axis and, during calibration, the position of the measurement system axis is determined in a coordinate system that is fixed relative to the reference feature.

* * * * *